United States Patent
Moon

(10) Patent No.: US 9,013,409 B2
(45) Date of Patent: Apr. 21, 2015

(54) DISPLAY, APPARATUS WITH SINGLE RF TRANSCEIVER FOR COMMUNICATION WITH HUMAN INPUT DEVICE AND FOR WLAN NETWORK ACCESS

(71) Applicant: LG Innotek Co., Ltd., Seoul (KR)

(72) Inventor: Hyoung Jin Moon, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 104 days.

(21) Appl. No.: 13/791,184

(22) Filed: Mar. 8, 2013

(65) Prior Publication Data

US 2013/0234946 A1 Sep. 12, 2013

(30) Foreign Application Priority Data

Mar. 8, 2012 (KR) .................. 10-2012-0024143

(51) Int. Cl.
| | | |
|---|---|---|
| H04N 5/44 | (2011.01) | |
| G06F 3/02 | (2006.01) | |
| G09G 5/00 | (2006.01) | |
| H04N 21/422 | (2011.01) | |
| G06F 3/038 | (2013.01) | |
| H04N 21/4363 | (2011.01) | |
| H04N 21/442 | (2011.01) | |

(52) U.S. Cl.
CPC ............ *G06F 3/02* (2013.01); *H04N 21/42204* (2013.01); *G06F 3/038* (2013.01); *G06F 2203/0384* (2013.01); *H04N 21/43637* (2013.01); *H04N 21/44227* (2013.01)

(58) Field of Classification Search
CPC ........... H04M 1/7253; H04M 1/72533; H04N 21/42204; H04N 21/43637; H04N 21/44227; G06F 3/02
USPC .................... 345/156–184; 348/734; 455/420
See application file for complete search history.

(56) References Cited

U.S. PATENT DOCUMENTS

2010/0153985 A1* 6/2010 Dey .............................. 725/25
2012/0140117 A1* 6/2012 Waites ......................... 348/563

OTHER PUBLICATIONS

Haartsen, Jaap C., "The Bluetooth Radio System", Feb. 2000, IEEE Personal Communications, pp. 6-14 (p. 8 in particular).*

* cited by examiner

*Primary Examiner* — Gerald Johnson
*Assistant Examiner* — Larry Sternbane
(74) *Attorney, Agent, or Firm* — Birch, Stewart, Kolasch & Birch, LLP

(57) ABSTRACT

Disclosed is a display system. The display system includes a display apparatus equipped with a wireless communication function, and a human input device connected with the display apparatus to transmit user input data to the display apparatus. The display apparatus allocates a communication channel dedicated for communication with the human input device among a plurality of communication channels, and receives the user input data through the allocated dedicated communication channel.

15 Claims, 4 Drawing Sheets

DISPLAY, APPARATUS WITH SINGLE RF TRANSCEIVER FOR COMMUNICATION WITH HUMAN INPUT DEVICE AND FOR WLAN NETWORK ACCESS

CROSS-REFERENCE TO RELATED APPLICATIONS

The present application claims priority under 35 U.S.C. 119 and 35 U.S.C. 365 to Korean Patent Application No. 10-2012-0024143 (filed on 8 Mar. 2012), which is hereby incorporated by reference in its entirety.

BACKGROUND

An input device is used to input data into a display apparatus such as a computer or a TV. In other words, computers display information by using "0" and "1" differently from the manner that humans analyze and memorize information. Accordingly, the input device reads data such as characters, diagrams, voice, and numbers used by humans, and converts the data into binary data including "0" and "1", so that the computer can process the data.

FIG. 1 is a block diagram showing a display system according to the related art.

Referring to FIG. 1, a display apparatus 10 includes a first WLAN module 12 and a second WLAN module 14.

The first WLAN module 12 provides an interface for connecting to a wired/wireless network through the Internet.

The first WLAN module 12 may be equipped with an Ethernet terminal in order to access the wired network, and may employ communication standards such as WLAN (Wi-Fi), Wireless broadband (Wibro), World Interoperability for Microwave Access (Wimax), and High Speed Downlink Packet Access (HSDPA).

In particular, the first WLAN module 12 accesses an access point (AP) to make data communication with another network device.

The second WLAN module 12 provides an interface for connecting to an HID 30 through the Internet.

The HID 30 refers to a human input device. The range of the human input device includes all devices, such as keyboards and cellular phones, having a key pad.

The second WLAN module 12 is separately provided from the first WLAN module 14. Accordingly, the second WLAN module 12 applies the data input through the HID 30 to keyboard interrupt.

In other words, the display system according to the related art accesses an AP 20 through the first WLAN module 12, and accesses the HID through the second WLAN module 14 to make data communication.

The second WLAN module 14 is an HID dedicated communication module to make data communication with the HID 30.

As described above, according to the related art, the display system additionally requires the second WLAN module for the communication with the HID in addition to the first WLAN module for the access to a network. Accordingly, as an additional WLAN module is required in order to make communication with the HID, the product cost is increased.

In addition, the second WLAN module recognizes a device connected thereto only as the HID instead of a typical network device. Accordingly, the communication with the network device using the second WLAN module is impossible, so that the use degree of the second WLAN module is lowered.

SUMMARY

The embodiment is to make wireless communication with different types of network devices through a typical WLAN module.

In addition, the embodiment is to receive data input from an HID without an additional dedicated WLAN module for the communication with a human input device (HID) device.

Meanwhile, the embodiments are not limited to the above object, and those skilled in the art can clearly understand other objects from following description.

According to the embodiment, there is provided a display system including a display apparatus equipped with a wireless communication function, and a human input device connected with the display apparatus to transmit user input data to the display apparatus. The display apparatus allocates a communication channel dedicated for communication with the human input device among a plurality of communication channels, and receives the user input data through the allocated dedicated communication channel.

In addition, the display apparatus fixes the allocated dedicated communication channel as a communication channel for the communication of the connected human input device, and restricts any other network device from connecting to the dedicated communication channel.

In addition, the display apparatus applies the received user input data to keyboard interrupt if the user input data are received through the allocated dedicated communication channel.

Further, the display apparatus operates as a station when using another communication channel other than the dedicated communication channel to attempt to access an access point (AP).

In addition, the display apparatus searches for the human input device located around the display apparatus, performs concurrent connection with the searched human input device, and establishes a communication channel connected with the human input device through the concurrent connection as the dedicated communication channel.

In addition, the user input data are transmitted to the display apparatus through the allocated dedicated communication channel and a transmission format of the user input data includes a human input device (HID) format.

Meanwhile, according to the embodiment, there is provided a display apparatus including a wireless LAN module connected with a human input device through a first communication channel, and accessing an access point (AP) through a second communication channel to make data communication, and a control unit allocating the first communication channel, which is selected from among a plurality of communication channels used in the wireless LAN module, as the dedicated communication channel for the connection with the human input device, and performing a control operation allowing the access to the access point (AP) through the second communication channel other than the first communication channel.

In addition, the control unit fixes the allocated dedicated communication channel as a communication channel for communication with the connected human input device if the dedicated communication channel for the connection with the human input device is allocated, and restricts any other network device from connecting to the dedicated communication channel.

In addition, if data are received through the allocated dedicated communication channel, the control unit applies the received data to keyboard interrupt.

In addition, the control unit searches for the human input device located around the wireless LAN module, and performs concurrent connection with the searched human input device.

In addition, user input data input to the human input device are transmitted to the wireless LAN module through the allocated dedicated communication channel, and a transmission format of the transmitted user input data includes a human input device (HID) format.

Meanwhile, according to the embodiment, there is provided a data communication method of a display apparatus including searching for a peripheral human input device, connecting with the human input device by allocating a communication channel for communication with the searched human input device, fixing the allocated communication channel as a dedicated communication channel for communication with the connected human input device, and receiving transmission data from the human input device through the dedicated communication channel.

In addition, another network device other than the human input device is restricted to be connected to the dedicated communication channel if the dedicated communication channel is fixed.

In addition, the data communication method further includes applying the received data to keyboard interrupt if the transmission data are received from the human input device through the dedicated communication channel.

In addition, the data communication method further includes attempting to access an access point (AP) through another communication channel other than the dedicated communication channel.

According to the embodiment, both of the access to the AP and the communication with the HID can be performed by using one WLAN module provided in the display apparatus according to the related art. Accordingly, an additional WLAN module dedicated for the communication with the HID is not required, so that the product cost can be reduced.

DETAILED DESCRIPTION OF THE EMBODIMENTS

The principle of the embodiments will be described below. Therefore, although not specifically described and depicted in the specification, a person having the ordinary skill in the art may realize the principle of the embodiments and may invent various apparatuses within the concept and scope of the embodiments. Further, in principle, conditional terms and embodiments mentioned in the specification shall be obviously intended to understand the concept of the embodiments and may not limit the scope of the embodiments.

Further it shall be understood that all detailed descriptions, which teach a specific embodiment as well as a principle, an aspect and embodiments, are intended to include structural and functional equivalents. Further, it should be understood that the equivalents may include equivalents to be developed in the future as well as known equivalents and may include all devices invented for performing the same functions regardless of the structure thereof.

Accordingly, for example, it should be understood that a block diagram of the specification illustrates a conceptual point of view of an illustrative circuit that realizes principles of the embodiment. In the same manner, it should be understood that all flowcharts, state transition diagrams, and pseudo codes may be actually represented in a computer readable medium and may represent various processes to be executed by a computer or a processor regardless of whether the computer or the processor is clearly shown.

Functions of various devices shown in drawings including a processor or a function block expressed as a concept similar to the processor may be provided by using hardware capable of executing suitable software as well as dedicated hardware. When the functions are provided by the processor, the functions may be provided by a single dedicated processor, a single shared processor, or a plurality of individual processors and a part of the functions may be shared.

It should be understood that use of a processor, a control or the term presented as a similar concept to the processor and the control shall not be interpreted as exclusively referring to hardware capable of executing software but shall be understood that it implicitly includes a digital signal processor (DSP), ROM, RAM, and non-volatile memory storing hardware and software. Other hardware generally known in the art may be included.

The embodiment provides a display apparatus, which is capable of making communication with a human input device (HID) as well as communication with an access point (AP) by using one WLAN module provided in the display apparatus, a display system, and a data communication method thereof.

Figure 1:
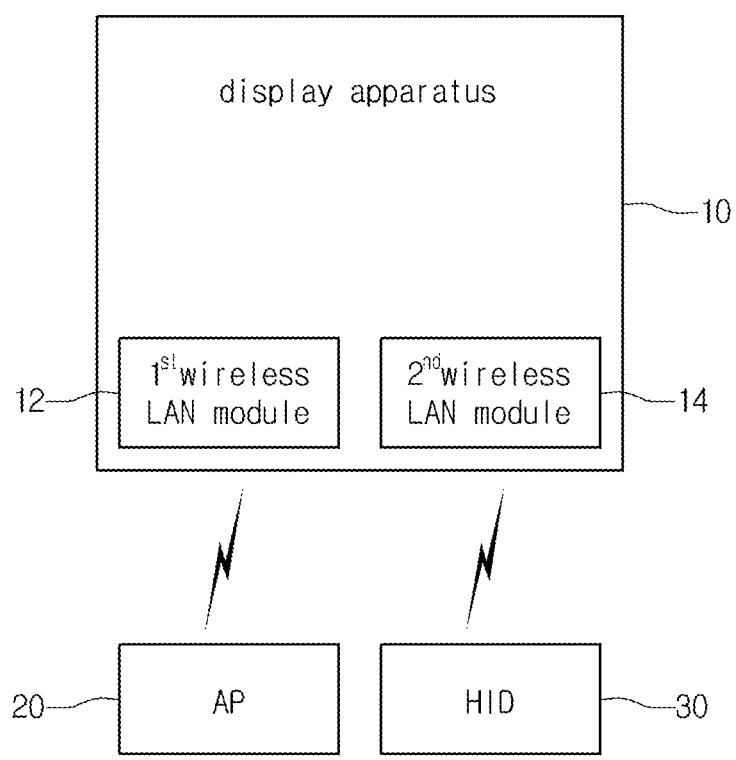
FIG. 1 is a block diagram showing a display system according to the related art.
Figure 2:
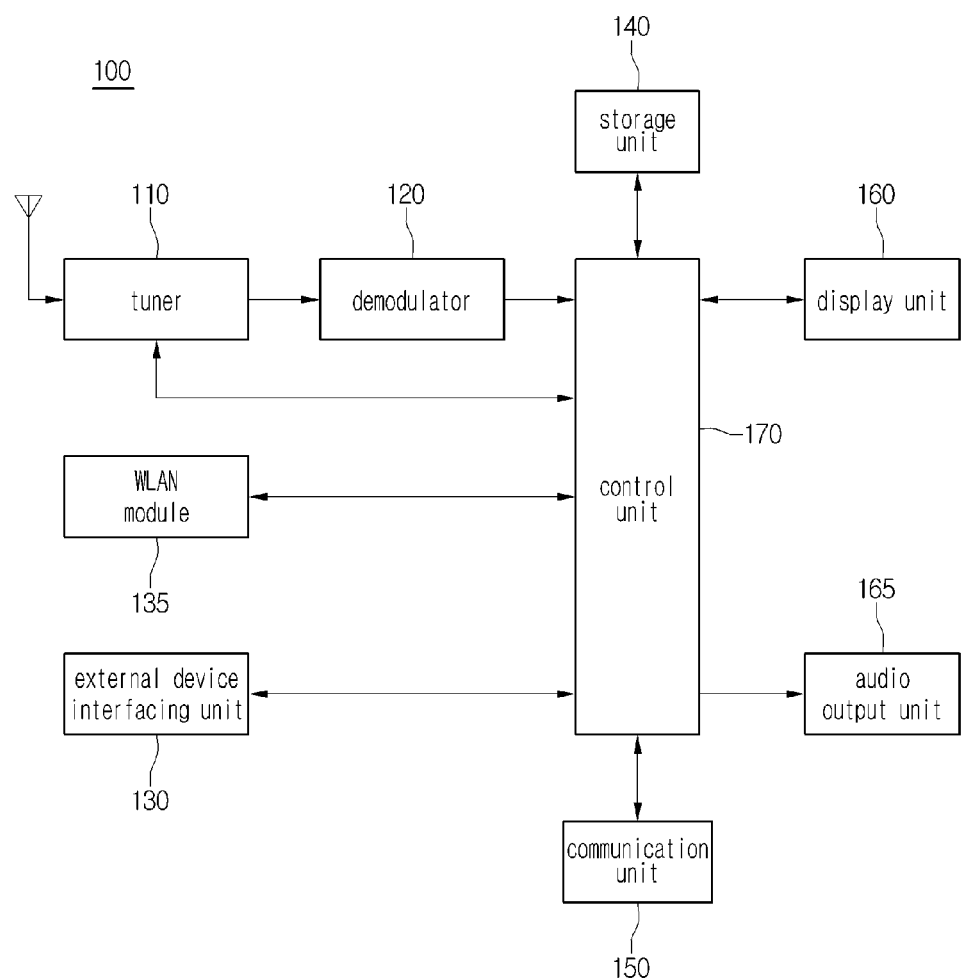
FIG. 2 is a block diagram showing a display apparatus according to the embodiment.

FIG. 2 is a block diagram showing a display apparatus 100 according to the embodiment.

Although drawings show that the display apparatus 100 includes a TV according to one embodiment, the display apparatus 100 may include a device such as a laptop computer, a personal computer (PC), or a monitor instead of TV.

Hereinafter, an example that the display apparatus 100 includes a TV will be described.

Referring to FIG. 2, the display apparatus 100 may include a tuner 110, a demodulator 120, an external device interfacing unit 130, a WLAN module 135, a storage unit 140, a communication unit 150, a display unit 160, an audio output unit 165, and a control unit 170.

The tuner 110 selects an RF broadcasting signal, which corresponds to a channel selected by a user, or RF broadcasting signals, which correspond to all previously-stored channels, among radio frequency (RF) broadcasting signals received through an antenna. In addition, the selected RF broadcasting signal is converted into an intermediate frequency signal, or a base-band image or voice signal.

The tuner 110 may receive RF broadcasting signals having a single carrier according to an advanced television system committee (ATSC) scheme and RF broadcasting signals having a plurality of carriers according to a digital video broadcasting (DVB) scheme.

The demodulator 120 receives a digital IF (DIF) signal converted in the tuner 110 to perform a demodulation operation. For example, the demodulator 120 performs an 8-VSB (7-Vestigal Side Band) modulation scheme if the DIF signal output from the tuner 110 is based on the ATSC scheme. In addition, the demodulator 120 may perform channel decoding. To this end, the demodulator 120 includes a trellis decoder, a de-interleaver, and a reed Solomon decoder to perform trellis decoding, de-interleaving, and reed Solomon decoding.

A stream signal output from the demodulator 120 may be input to the control unit 170. After performing de-multiplexing, and image/voice signal processing, the control unit 170 outputs the image to the display unit 160, and outputs the voice to the audio output unit 165.

The external device interfacing unit 130 may receive data transmitted through an external device connected thereto or transmit data to the external device connected thereto.

To this end, the external device interfacing unit 130 may include an A/V input/output unit (not shown).

The external device interfacing unit 130 may be connected to an external device such as a digital versatile disk (DVD), a Blu-ray disk, a game device, a camera, a camcorder, or a computer (laptop computer) through a cable or wirelessly.

The external device interfacing unit 130 receives external video, voice, or data signals through the external device connected thereto, and transmits the signals to the control unit 170.

The A/V input/output unit may include a USB terminal, a composite video banking sync (CVBS) terminal, a component terminal, an S-video terminal (analog), a digital visual interface (DVI) terminal, a high definition multimedia interface (HDMI) terminal, an RGB terminal, or a D-SUB terminal, so that the video and voice signals of the external device may be input to the display apparatus 100.

The WLAN module 135 provides an interface to connect to a wired/wireless network including the Internet.

The WLAN module 135 may include an Ethernet terminal in order to access the wired network, and may use communication standards such as a WLAN (Wi-Fi), a Wireless broadband (Wibro), a World Interoperability for Microwave Access (Wimax), and a High Speed Downlink Packet Access (HSDPA) in order to access the wireless network.

In this case, preferably, the WLAN module 135 uses the WLAN (Wi-Fi) communication standard.

The WLAN module 135 makes communication with an external network device through communication channels.

In this case, the WLAN module 135 dedicates a specific communication channel to make communication with the HID. Accordingly, the WLAN module 135 makes communication only with the HID through the dedicated communication channel.

In addition, the WLAN module 135 restricts the connection of another network device to the dedicated communication channel. Accordingly, the WLAN module 135 makes data communication only with the HID through the dedicated communication channel.

Further, the WLAN module 135 operates as a WLAN-station (STA) when making communication through remaining communication channels other than the dedicated communication channel. As the WLAN module 135 operates as the WLAN-STA, the WLAN module 135 is connected to an access point (AP).

In other words, the dedicated communication channel among the communication channels of the WLAN module 135 is fixedly allocated for the purpose of the communication only with the HID. The remaining communication channels other than the dedicated communication channel are allocated for the purpose of the connection with the AP.

In addition, the display apparatus 100 may be networked with another electronic device according to short-range communication standards such as Bluetooth, Radio Frequency Identification (RFID), infrared Data Association (IrDA), Ultra Wideband (UWB), ZigBee, and Digital Living Network Alliance (DLNA).

The storage unit 140 may store programs for signal processing in the control unit 170 and the control of the control unit 170, and may store video, voice, or data signals subject to signal processing.

In addition, the storage unit 140 may temporarily store video, voice, or data signals input therein from the external device interfacing unit 130. Further, the storage unit 140 may store the information of a predetermined broadcasting channel through a channel memorizing function such as a channel map.

The storage unit 140 may include at least one of storage media such as a flash memory type memory, a hard disk type memory, a multimedia card micro type memory, a card type memory (e.g., SD memory or XD memory), a RAM, and a ROM (EEPROM).

The display apparatus 100 may provide files (moving picture files, still image files, music files, and document files) stored in the storage unit 140 to a user by reproducing the files.

The communication unit 150 may make communication with an additional device. The communication unit 150 may make communication with the WLAN module 135 through a different scheme according to the communication standards such as Wi-Fi, Bluetooth, RFID, IrDA, UWB, ZigBee, and DLNA.

The control unit 170 may de-multiplex streams input through the tuner 110, the demodulator 120, or the external device interfacing unit 130, or may process the de-multiplexed signals to produce and output video signals or voice signals.

The video signals processed in the control unit 170 may be input to the display unit 160 and displayed as a video corresponding to the video signals.

In addition, the video signals, which are subject to the control unit 170, may be input into an external output device through the external device interfacing unit 130.

The voice signals processed in the control unit 170 may be sound-output to the audio output unit 165. In addition, the voice signals processed in the control unit 170 may be input into the external output device through the external device interfacing unit 130.

In addition, the control unit 170 may control the overall operation in the display apparatus 100.

For example, the control unit 170 controls the tuner 110 so that the tuner 110 may tune RF broadcasting corresponding to the channel selected by the user or the previously-stored channel.

In addition, the control unit 170 may control the display unit 100 through a user command or the internal program.

For example, the control unit 170 controls the tuner 110 to input signals of a channel selected according to a user command, that is, a predetermined channel selection command. In addition, the control unit 170 processes the video, voice, or data signals corresponding to the selected channel. The control unit 170 may perform a control operation to output the information of the channel selected by the user through the display unit 160 and the audio output unit 165 together with the processed video or voice signals.

In addition, the control unit 170 may output video or voice signals, which are input from an external device, such as a camera or a camcorder through the external device interfacing unit 130, by the display unit 160 or the audio output unit according to an external device video reproduction command input from the user.

Meanwhile, the control unit 170 may control the display unit 160 to display videos such as the broadcasting video input through the tuner 110, the external input video input through the external device interfacing unit 130, the video input through the WLAN module 135, or the video stored in the stage unit 140.

In this case, the video displayed on the display unit 160 may include as still image, or a moving picture. In other words, the video displayed on the display init 160 may include a 2D-image or a 3D-image.

Meanwhile, the control unit 170 makes a predetermined object of the video displayed on the display unit 160 as a 3D object so that the 3D object may be displayed. For example, the object may be at least one of an accessed web screen image (paper, or magazine), an electronic program guide (EPG), various menus, a wizet, an icon, a still image, a moving picture, and a texture.

The 3D object may be processed to have the depth different from that of the video displayed on the display unit 160. Preferably, the 3D object may be processed in such a manner that the 3D object seems to protrude out of the video displayed on the display unit 160.

In particular, the control unit 170 controls the WLAN module 135 to make communication with a plurality of devices different from each other.

To this end, the control unit 170 fixedly allocates a specific communication channel among communication channels for the data communication with the WLAN module 135 as a communication channel for the communication with the HID.

In other words, the control unit 170 allocates the specific communication channel among the communication channels of the WLAN module 135 as the dedicated communication channel for the communication with the HID.

In this case, if the dedicated communication channel of the HID is allocated, the control unit 170 restricts the connection of another network device with the dedicated communication channel, so that only the communication with the HID is performed through the dedicated communication channel.

To this end, the control unit 170 searches for an HID located around the control unit 170 by using the WLAN module 135. If the HID is searched, the control unit 170 performs the concurrent connection with the searched HID.

In other words, the WLAN module 135 supports the concurrent connection function to perform the concurrent connection with the searched human input device.

The control unit 170 fixes the communication channel connected with the HID through the concurrent connection with the HID as a human input device path, so that the communication channel is allocated as a dedicated communication channel for the communication with the HID.

If the dedicated communication channel is allocated by the control unit 170, the WLAN module 135 is connected with the HID through the allocated dedicated communication channel to receive data transmitted from the HID.

In this case, the HID transmits the data having an HID format without an addition data format transformation, and the WLAN module 135 receives HID-format data transmitted through the HID and transmits the HID-format data to the control unit 170.

The control unit 170 receives the data through the WLAN module 135 and performs the operation according to the data.

For example, if the data are received from the dedicated communication channel through the WLAN module 135, the control unit 170 recognizes that the data are received through the HID to apply the data to system keyboard interrupt.

In addition, if the data are received through another communication channel instead of the dedicated communication channel, the control unit 170 receives and analyzes the data and performs an operation according to the analysis result.

The data received through another communication channel instead of the dedicated communication channel may include video data or voice data transmitted through the network device. In addition, the data may include various pieces of additional information.

Figure 3:
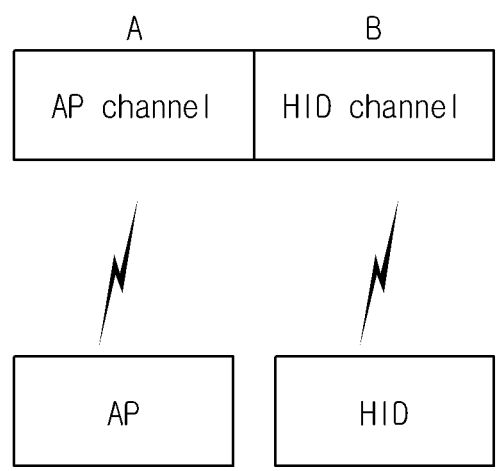
FIG. 3 is a view used to explain a communication channel according to the embodiment.

FIG. 3 is a view used to explain a communication channel according to the embodiment.

Referring to FIG. 3, the WLAN module 135 makes communication with the network device through a plurality of communication channels.

In this case, the WLAN module 135 searches for the HID located around the WLAN module 135 according to the control signal of the control unit 170, and performs the concurrent connection with the searched HID.

In addition, if the WLAN module 135 is connected to the HID, the connected communication channel is established to a dedicated communication channel B for the communication with the connected HID.

Thereafter, the WLAN module 135 makes only the communication with the connected HID while preventing the connection with another network device through the established dedicated communication channel B.

In addition, the WLAN module 135 operates as a WLAN-STA through remaining communication channels A except for the dedicated communication channel to access the AP so that the WLAN module 135 makes the communication with another network device except for the HID.

Figure 4:
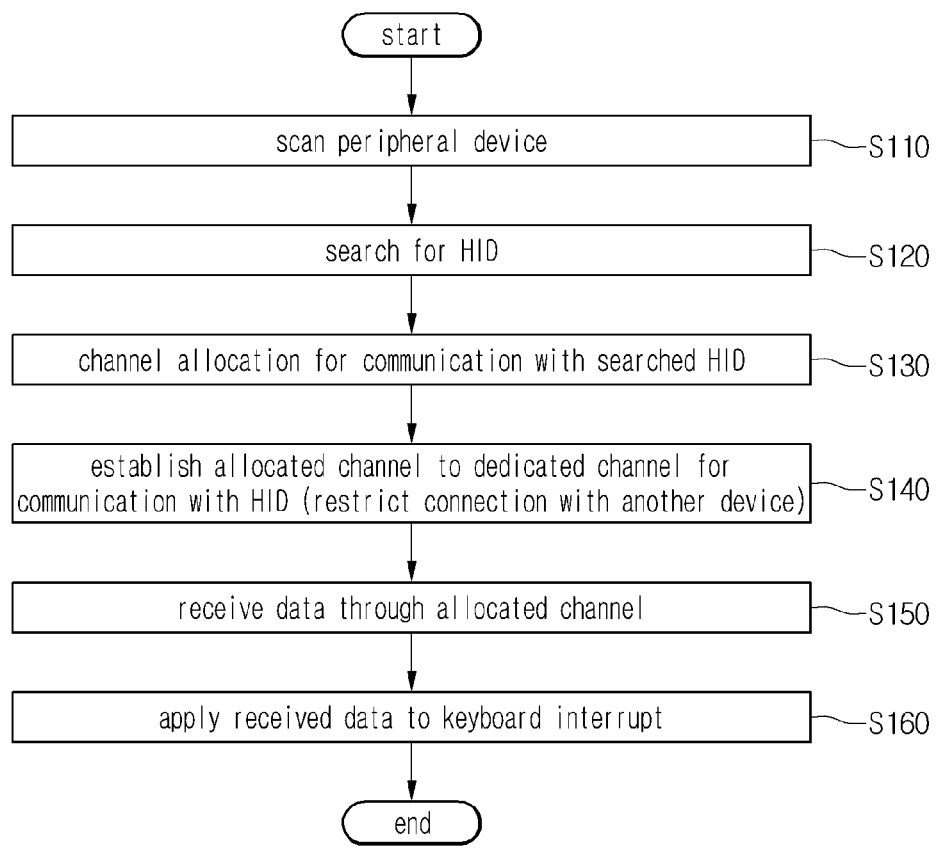
FIG. 4 is a flowchart showing a data communication method of the display apparatus according to the embodiment.

FIG. 4 is a flowchart showing the data communication method of the display apparatus 100 according to the embodiment.

Referring to FIG. 4, according to the data communication method, devices around the display apparatus 100 are searched by using the WLAN module 135 (step S110).

Thereafter, the HID is searched in the searched devices (step S120).

If the HID is searched, the control unit 170 performs the concurrent connection with the searched HID. Accordingly, the communication channel used to connect with the HID is allocated as a dedicated communication channel for the communication with the HID (step S130).

Thereafter, as the dedicated communication channel is allocated, the WLAN module 135 makes only the communication with the HID through the dedicated communication channel (step S140).

In this case, the control unit 170 restricts the connection with another device through the allocated dedicated communication channel, so that the dedicated communication channel is used only for the HID.

Thereafter, the WLAN module 135 receives data through the allocated dedicated communication channel (step S150).

If the data are received, the control unit 170 recognizes the data received through the dedicated communication channel as input device data, so that the data are applied to the keyboard interrupt (step S160).

According to the embodiment, both of the access to the AP and the communication with the HID can be performed by using one WLAN module provided in the display apparatus according to the related art. Accordingly, an additional WLAN module dedicated for the communication with the HID is not required, so that the product cost can be reduced.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display system comprising:
a display apparatus equipped with a wireless communication function; and
a human input device connected with the display apparatus to transmit user input data to the display apparatus,
wherein the display apparatus allocates a communication channel dedicated for communication with the human input device among a plurality of communication channels, and receives the user input data through the allocated dedicated communication channel,
wherein the display apparatus is configured to communicate with the human input device and access an access point by using a single wireless LAN module, and
wherein the single wireless LAN module is configured to communicate only with the human input device through the allocated dedicated communication channel and connect with the access point through remaining communication channels other than the allocated dedicated communication channel.

2. The display system of claim 1, wherein the display apparatus fixes the allocated dedicated communication channel as a communication channel for the communication of the connected human input device, and restricts any other network device from connecting to the dedicated communication channel.

3. The display system of claim 1, wherein the display apparatus applies the received user input data to keyboard interrupt if the user input data are received through the allocated dedicated communication channel.

4. The display system of claim 1, wherein the display apparatus operates as a station when using another communication channel other than the dedicated communication channel to attempt to access an access point (AP).

5. The display system of claim 1, wherein the display apparatus searches for the human input device located around the display apparatus, performs concurrent connection with the searched human input device, and establishes a communication channel connected with the human input device through the concurrent connection as the dedicated communication channel.

6. The display system of claim 1, wherein the user input data are transmitted to the display apparatus through the allocated dedicated communication channel.

7. A display apparatus comprising:
a wireless LAN module connected with a human input device through a first communication channel, and accessing an access point (AP) through a second communication channel to make data communication; and
a control unit allocating the first communication channel, which is selected from among a plurality of communication channels used in the wireless LAN module, as the dedicated communication channel for the connection with the human input device, and performing a control operation allowing the access to the access point (AP) through the second communication channel other than the first communication channel,
wherein the control unit is configured to communicate with the human input device and access the AP by using a single wireless LAN module, and
wherein the single wireless LAN module is configured to communicate only with the human input device through the allocated dedicated communication channel and connect with the access point through remaining communication channels other than the allocated dedicated communication channel.

8. The display apparatus of claim 7, wherein the control unit fixes the allocated dedicated communication channel as a communication channel for communication with the connected human input device if the dedicated communication channel for the connection with the human input device is allocated, and restricts any other network device from connecting to the dedicated communication channel.

9. The display apparatus of claim 7, wherein, if data are received through the allocated dedicated communication channel, the control unit applies the received data to keyboard interrupt.

10. The display apparatus of claim 7, wherein the control unit searches for the human input device located around the wireless LAN module, and performs concurrent connection with the searched human input device.

11. The display apparatus of claim 7, wherein user input data input to the human input device are transmitted to the wireless LAN module through the allocated dedicated communication channel.

12. A data communication method of a display apparatus, the method comprising:
searching for a peripheral human input device;
connecting with the human input device by allocating a communication channel for communication with the searched human input device;
fixing the allocated communication channel as a dedicated communication channel for communication with the connected human input device; and
receiving transmission data from the human input device through the dedicated communication channel,
wherein the display apparatus is configured to communicate with the human input device and access an access point by using a single wireless LAN module, and
wherein the single wireless LAN module is configured to communicate only with the human input device through the allocated dedicated communication channel and connect with the access point through remaining communication channels other than the allocated dedicated communication channel.

13. The data communication method of claim 12, wherein any other network device other than the human input device is restricted from connecting to the dedicated communication channel if the dedicated communication channel is fixed.

14. The data communication method of claim 12, further comprising applying the received data to keyboard interrupt if the transmission data are received from the human input device through the dedicated communication channel.

15. The data communication method of claim 12, further comprising attempting to access an access point (AP) through another communication channel other than the dedicated communication channel.

* * * * *